Patented June 11, 1929.

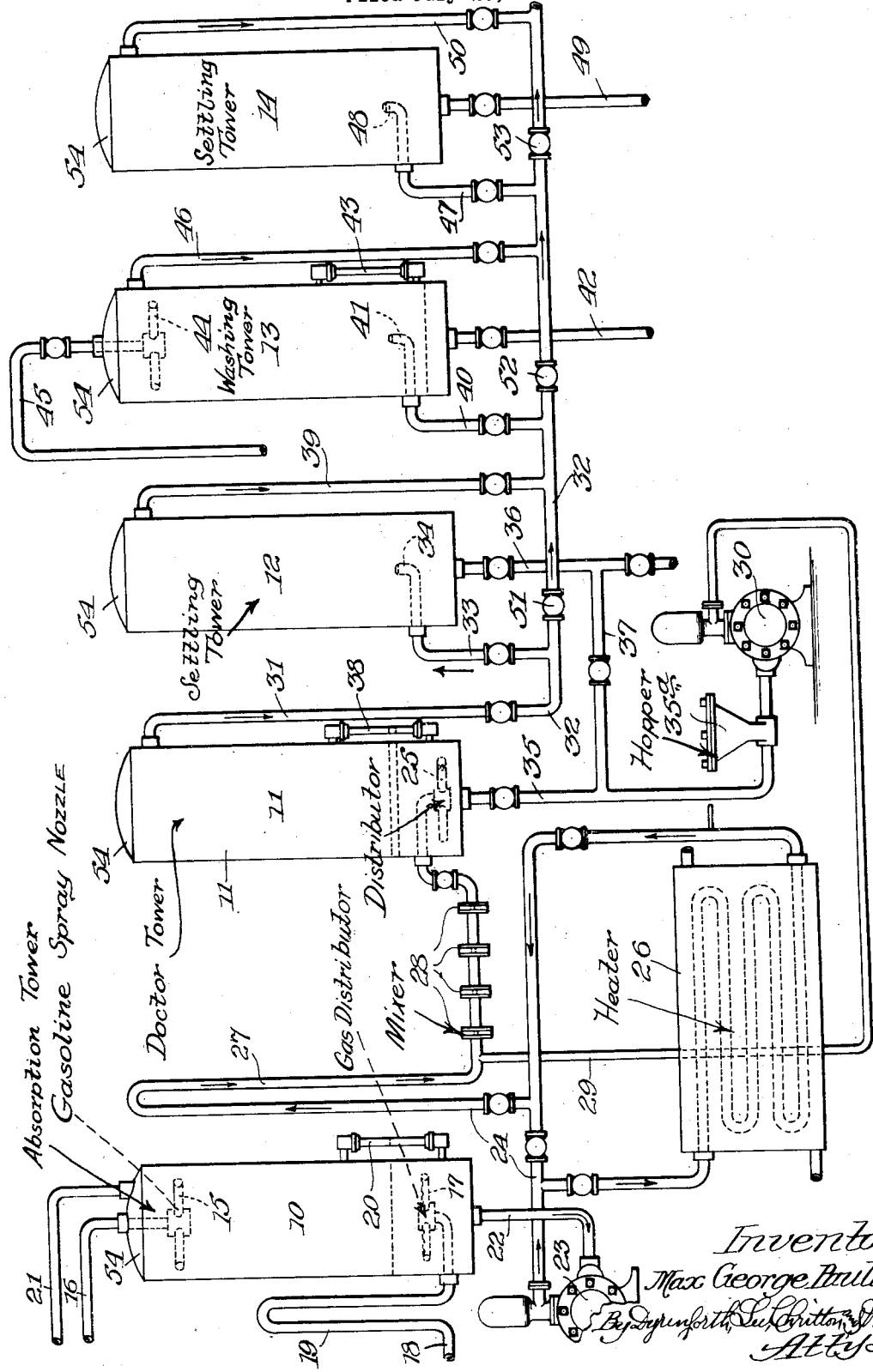

1,716,973

UNITED STATES PATENT OFFICE.

MAX GEORGE PAULUS, OF CASPER, WYOMING, ASSIGNOR TO STANDARD OIL COMPANY, OF WHITING, INDIANA, A CORPORATION OF INDIANA.

ART OF SWEETENING HYDROCARBON OILS.

Application filed July 20, 1926. Serial No. 123,715.

The present invention relates to the sweetening of hydrocarbon oils containing sulfur compounds and particularly to the treatment of such oils with hydrogen sulfide and doctor solution for the purpose of sweetening them.

It has been found that this treatment is ineffectual in refinery apparatus under ordinary conditions, the treated oil containing excessive quantities of sulfur in objectionable form. The present invention is based upon the discovery that this objection can be avoided and the method rendered completely satisfactory for plant operation by conducting it in the absence of air. The invention will readily be understood from the following detailed example of one method of sweetening gasoline according to the present invention.

The accompanying drawing shows in elevation a suitable apparatus for this purpose.

Referring to the drawing, 10 is an absorption tower, 11 a doctor tower, 12 a settling tower, 13 a washing tower and 14 a settling tower. In the upper portion of the absorption tower 10, is a spray nozzle 15, which is supplied with gasoline from a pipe 16. In the base of the absorption tower is gas distributor 17, which is supplied with hydrogen sulfide from pipe 18, provided with a siphon bend 19 to prevent flow-back of gasoline therethrough. The absorption tower 10 is provided with a gauge glass 20 near its base and is provided with an excess gas pipe 21 leading from the top thereof and a gasoline draw-off pipe 22 leading from the bottom thereof to a pump 23, the pressure side of which communicates with a pipe 24, leading to a distributor 25 in the base of the doctor tower 11. The distributor 25 is preferably a spider with curved arms so as to impart a whirling motion to the liquids in the doctor tower. In parallel with pipe 24 is a heater 26, suitable valves being provided to pass the gasoline therethrough when necessary. The pipe 24 is provided with a tall siphon bend 27 for the purpose of preventing flow-back of doctor solution and between the siphon bend 27 and the tower 11 is provided with a mixer 28 which is preferably of the knot-hole type, that is, a mixer constituted by a pipe with a series of restricted passages at intervals therein. The pipe 24 between the siphon bend 27 and the mixer 28 is connected with a pipe 29 through which doctor solution is supplied to the flowing gasoline by pump 30 from the base of the doctor tower 11. The tower 11, is provided near its top with a valved gasoline draw-off pipe 31 which communicates with a manifold 32. Extending from manifold 32 is a valved pipe 33 which enters the settling tower 12 somewhat above its base and terminates in a small upturned portion 34. The towers 11 and 12 are provided at their bases with valved draw-off pipes 35 and 36, interconnected by valved pipe 37. The pipe 35 is connected with the exhaust side of the pump 30, and is provided with a suitable hopper 35ª for replenishing the content of litharge or caustic soda in the doctor solution. The tower 11 is provided with a gauge glass 38 near its base. The tower 12 is provided near its top with a valved gasoline draw-off pipe 39 which extends to the manifold 32. Adjacent the pipe 39 is a valved pipe 40 also communicating with the manifold 32, which extends into tower 13 near its base and terminates in a short upturned portion 41. The tower 13 is provided at its bottom with a water draw-off pipe 42, with a gauge-glass 43 near its bottom and with a liquid distributor 44, near its top, adapted to be supplied with water by pipe 45. Near the top of the tower 13, is a valved gasoline draw-off pipe 46 which extends to the manifold 32. Adjacent the pipe 46 and also communicating with the manifold 32 is a valved pipe 47 which extends into tower 14 near its bottom and terminates in an upturned portion 48. The tower 14 is provided at its bottom with a water draw-off pipe 49 and near its top with a valved gasoline draw-off pipe 50 which conducts the treated gasoline to the manifold 32, which communicates with suitable storage receptacles. The manifold 32 is provided with valves 51, 52 and 53 opposite the towers 12, 13 and 14 so that by manipulation of these valves and the valves in pipes 33, 39, 40, 46, 47 and 50, any of these towers can be operated or by-passed at will. It is to be noted that the towers 10, 11, 12, 13 and 14 are closed at the top by covers 54 and that the whole system is air-tight, the mixing being effected without admission of oxygen containing gases, by mixer 28.

The operation of the improved method is as follows: Sour gasoline is pumped through pipe 16 to the distributor 15 within the tower 10, which subdivides the gasoline which descends as a spray or rain through the tower 10. The pump 23 is operated at such a rate that a certain accumulation of gasoline is formed in the base of tower 16, the level thereof being indicated by gauge glass 20. The accumulated gasoline should substantially submerge the distributor 17. Hydrogen sulfide is introduced by the pipe 18 under suitable pressure, for example six pounds to the square inch, to the distributor 17 which delivers the gas to the gasoline in the form of small bubbles which ascend to the surface of the accumulated gasoline and the gas then proceeds upwardly in countercurrent to the descending spray or rain of gasoline. Excess hydrogen sulfide escapes by pipe 21. The pump 23 withdraws gasoline through pipe 22 and propels it through the pipe 24 and "doctor" solution is fed thereto by pump 30 through pipe 29, the gasoline and "doctor" being thoroughly mixed by passage through the mixer 28. The ratio of doctor to oil in the mixture passing to the distributor 25 should be about 1 to 4. When the temperature drops to 40° F. or lower, the sweetening reaction slows up to such an extent that it is necessary to pass the oil through the heater 26 to raise the reacting substances to a suitable temperature. The heater 26 may be heated by a suitable heating medium such as exhaust steam. In the doctor tower 11, separation into gasoline and doctor layers takes place and practically all doctor and most of the lead sulfide settles out in this tower. A pool of doctor is maintained in the base of the tower 11, the level of this pool being shown by gauge glass 38. This pool should be sufficient to submerge substantially the distributor 25, so that the mixture of doctor and gasoline is injected in finely divided form from the distributor 25 into a mass of doctor solution, the globules of gasoline being thus compelled to pass upwardly through the mass, thus ensuring complete treatment with the doctor solution. From the base of the tower 11, doctor is drawn off by pump 30 through pipe 35 and forced through pipe 29 into the oil passing through pipe 24 to the mixer 28. The lead content of the doctor is maintained by adding litharge by means of the hopper 35ᵃ about every eight hours, and the concentration of caustic soda should be maintained constant, for example, by concentrating by evaporation every few weeks. From doctor tower 11 the gasoline passes into the settling tower 12 by pipes 31 and 33, being fed upwardly thereinto somewhat above the base of the tower by means of the upturned portion 34 of the pipe 33. Settled gasoline is withdrawn by pipe 39 and lead sulfide by pipe 36. When new doctor is added, some of it passes over into tower 12; when this occurs, it may be returned to pipe 35 by suitable adjustment of the valves in pipes 36 and 37. When operating at a moderate rate, that is, below 150 barrels per hour with towers 10, 11 and 12 of 10 feet diameter by 25 feet high, the gasoline passing from tower 12 is clear and sweet and may be passed by the manifold 32 to storage, the valves 52 and 53 being opened and the valves in pipes 40, 46, 47 and 50 being closed. When, however, the apparatus is worked at a greater rate than 150 barrels per hour, it is necessary to subject the gasoline from tower 12 to further treatment for the removal of lead sulfide. For this purpose the gasoline is passed by pipes 39 and 40, (valves 52 and 53 being closed and the valves in pipes 40, 43, 47 and 48 being open), into the tower 13, being projected upwardly by the upturned portion 41 of the pipe 40. Hot water is supplied by pipe 45 to the distributor 44 which divides it into small drops which fall through the body of gasoline in the tower 13, thereby washing the gasoline and causing the lead sulfide to settle. Water and lead sulfide are removed from the base of the tower 13 by pipe 42, the valve thereof being so adjusted as to maintain a quantity of water in the base of the tower, the level of which is shown by gauge glass 43. The gasoline is passed from the washing tower 13 into the settling tower 14 by pipes 46 and 47 and is projected upwardly therein by the upturned portion 48 of the pipe 47. The water which settles out in this tower is drawn off at the bottom by pipe 49 and the gasoline is led off from the top of the tower 14 by pipe 50 which conducts it to the manifold 32, from which it passes to suitable storage receptacles (not shown).

It is to be understood that the improved method is not restricted to the particular apparatus shown since many other forms of apparatus may be employed within the terms of the appended claims. It must also be understood that the invention is not intended to be limited to the sweetening of gasoline, since other distillates may be sweetened in the same manner. In treating distillates heavier than gasoline, it is frequently desirable to facilitate reaction by heating the oil, for example, by passage through the heater 26, and to take such steps to prevent emulsification and aid settling, as by the provision of additional washing and settling towers, as may be found necessary.

The hydrogen sulfide supplied to the absorption may be obtained from any suitable source. It is preferred to employ where possible, still gases containing hydrogen sulfide obtained in the refinement of certain crude oils, notably oils obtained in Wyoming. The amount of hydrogen sulfide gas required in the operation is readily determined by experiment. Samples of the gasoline or other oil to be treated are caused to dissolve varying amounts of hydrogen sulfide gas, the samples are then treated with doctor solution in the usual manner, and tests run upon the resulting products indicate the proper proportion of hydrogen sulfide gas required for the particular oil. Thus, for gasolines from certain Wyoming oils, it is found that the proportion of hydrogen sulfide gas required varies from 0.0008 to 0.001% by weight (48.3 to 60 cubic inches of hydrogen sulfide gas at 60° F. and 635 mm. pressure per barrel of gasoline). The effective sweetening is dependent upon the production within the oil of a colloidal or finely divided precipitate of black lead sulfide and the amount of hydrogen sulfide should be sufficient to insure an adequate precipitate. On the other hand, excess of hydrogen sulfide causes excessive consumption of litharge and should be avoided as far as possible, while ensuring satisfactory sweetening.

This application is a continuation, in part, of U. S. application Serial No. 33,501, filed May 28, 1925.

I claim:

1. The method of removing sulfur compounds from hydrocarbon oil which consists in dissolving hydrogen sulfide in the oil and then treating the oil with "doctor," all of such treatment being effected with the exclusion of air.

2. The method of removing sulfur compounds of hydrocarbon oil which consists in dissolving hydrogen sulfide in the oil, intimately mixing therewith an alkaline plumbite solution and separating the treated oil from the alkaline lead salt solution, all of such treatment being effected with the exclusion of air.

3. The method of sweetening hydrocarbon oil which consists in subjecting sour oil to the simultaneous action of hydrogen sulfide and an alkaline plumbite, all while excluding air.

4. The method of sweetening hydrocarbon oil which consists in subjecting sour oil to the simultaneous action of hydrogen sulfide and an alkaline plumbite and subsequently washing, all of such treatment being effected with the exclusion of air.

5. The method of sweetening hydrocarbon oil which consists in dissolving hydrogen sulfide in the oil, adding doctor solution to the oil and intimately mixing the oil and the doctor, separating the oil from the doctor solution and washing the separated oil, said dissolution, addition, mixing, separation and washing being effected with the exclusion of air.

6. The method of removing sulfur compounds from hydrocarbon oils which comprises contacting said oil while in movement with hydrogen sulfide while excluding air, thereby dissolving hydrogen sulfide therein, passing a stream of the oil containing dissolved hydrogen sulfide through a confined passage, admixing doctor solution therewith while passing through said passage, air being excluded from said passage, and subsequently separating the treated oil from the spent doctor.

7. The method of removing sulfur compounds from hydrocarbon oils which comprises contacting said oil with hydrogen sulfide in an absorption tower in the absence of air, thereby dissolving hydrogen sulfide therein, withdrawing a stream of oil containing dissolved hydrogen sulfide from said tower through a confined passage, admixing doctor solution therewith while passing through said passage, air being excluded from said passage, supplying the liquids to a settling chamber, permitting the liquids to separate by gravity therein and withdrawing separate streams of oil and doctor from said settling chamber.

8. The continuous process of sweetening oils which comprises spraying the oil into a closed container in an atmosphere of $H_2S$, passing the oil continuously through a mixing device and through a doctor solution, and passing the material continuously through a settling tower to storage, all of such treatment being effected with the exclusion of air.

In testimony whereof, I have hereunto set my hand this 13th day of July, 1926.

MAX GEORGE PAULUS.